United States Patent [19]
Durand

[11] 3,927,575
[45] Dec. 23, 1975

[54] GEAR REDUCTION DEVICE WITH FLOATING PINION

[76] Inventor: Francois Durand, 11 rue du Bateau, Antibes, France

[22] Filed: Jan. 2, 1974

[21] Appl. No.: 429,760

[52] U.S. Cl. .................. 74/410; 74/380; 74/395; 74/411
[51] Int. Cl.² .................. F16H 57/00; F16H 35/00
[58] Field of Search ............ 74/380, 383, 384, 392, 74/395, 396, 397, 400, 401, 410, 665 B, 409, 411; 403/57, 58

[56] References Cited
UNITED STATES PATENTS

| | | | |
|---|---|---|---|
| 2,899,225 | 8/1959 | Birr | 403/58 |
| 3,167,975 | 2/1965 | Durand | 74/410 X |
| 3,299,729 | 1/1967 | Durand | 74/410 X |
| 3,360,286 | 12/1967 | Smyth | 403/58 X |
| 3,461,735 | 8/1969 | Durand | 74/410 |
| 3,572,150 | 3/1971 | Durand | 74/410 |
| 3,778,860 | 12/1973 | Thielen | 403/58 X |

*Primary Examiner*—Samuel Scott
*Assistant Examiner*—Lance W. Chandler
*Attorney, Agent, or Firm*—Wood, Herron & Evans

[57] ABSTRACT

A floating pinion engaged with a main gear, the floating pinion being mounted in a carriage adapted to roll along the periphery of the main gear. The carriage is interconnected with ground by two coupling bars symmetrically disposed on opposite sides of, and outside of, the main gear. Each coupling bar is connected to the carriage by an articulated joint at one end, and to ground through a universal type joint at the other end. Preferably, only a single universal type joint is used, that joint having an axis of rotation disposed in the median plane of the main gear.

4 Claims, 2 Drawing Figures

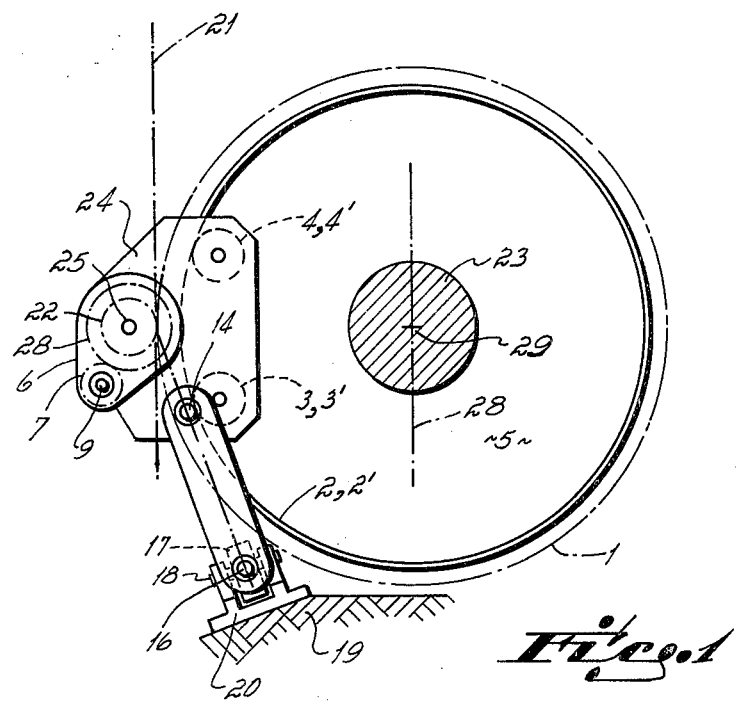
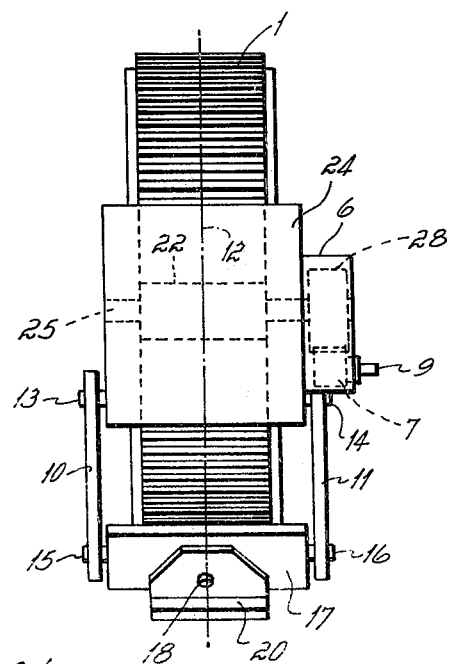

GEAR REDUCTION DEVICE WITH FLOATING PINION

When designing gear reduction devices it is common practice to mount the pinion on a carriage which is able to roll along the outer edge of the main gear to which it is engaged. In that case, the reactive forces developed by the gear teeth are absorbed by a coupling bar which is articulated at both ends and located on the median plane of the main gear.

Whenever the coupling bar forms an angle with the tangent line of the main gear and the pinion, it becomes possible to reduce considerably the forces exerted on the rollers of the carriage.

In certain cases, the coupling bar is forced to move toward the teeth of the main gear due to the forces acting on it, and eventually the coupling bar may come to contact with said gear teeth.

The purpose of the present invention is to avoid this inconvenience by replacing the single coupling bar with a system of two coupling bars which are articulated to the sides of the carriage.

Both coupling bars according to the invention are parallel and equidistant from the median plane of the main gear. At their lower ends, they are articulated to the ends of a swing bar whose axis of rotation is attached to a bracket which in turn is affixed to the ground.

The attached FIGS. 1 and 2 represent one version of a device according to the present invention.

FIG. 2 is a front view of the gear train pictured in FIG. 1.

The main gear 1 is fixed to axle 23 and engages with the floating pinion 22. The pinion 22 is fixed to axle 25 carried by the carriage 24.

The carriage 24 is able to roll along the inside guides 2, 2' defined by the edge of the main gear by means of the rollers 3, 3' and 4, 4'; the rollers 3, 3' and 4, 4' are also carried by the carriage.

The guides 2 and 2', as well as the rollers 3, 4 and 3', 4', are symmetrically positioned on both sides of the central web 5 of the main gear 1.

The primary gear reduction 6, consisting of the pinion 7 and the secondary gear 28 which is rigidly attached to the pinion 22, is also carried by the carriage 24.

The drive axle 9 is rigidly attached to the pinion 7.

The coupling bars 10 and 11 are parallel to the median plane 12 of the main gear 1. These coupling bars are secured to the carriage 24 by means of the articulated joints 13 and 14, and to the swing bar 17 by means of the articulated joints 15 and 16. The transversal shaft 18 is fixed to the swing bar 17, and is located on the median plane 12 of the main gear 1. The transversal shaft 18 is pivotally carried in the bracket 20 which in turn is affixed to the ground 19. Thus, the articulated joints 15, 16, and the pivotal connection of shaft 18 in bracket 20, serve to provide a universal joint type of interconnection between arms 10, 11 and ground 19 for the carriage 24. It is easy to see that when the lines of force of the coupling bars 10 and 11 form an acute angle with a first or tangent line 21, the coupling bars may move freely on either side of the main gear without any danger of interferring with its teeth, since the swing bar 17 serves to balance the forces along the periphery of the gear. Note that this universal type joint is located on ground 19 between the tangent line 21 and a second line 28 parallel to the tangent line, that second line 28 passing through the center axis 29 of the main gear 1.

Having described the preferred embodiment of my invention in detail, what I desire to claim and protect by Letters Patent is:

1. Carriage support structure for a gear reduction device having a floating pinion adapted to mate with a main gear, said pinion being mounted in a carriage adapted to roll along the periphery of the main gear, said carriage support structure including
   at least one roller connected to said carriage, said roller being adapted to roll along an inside guide defined by said main gear to hold said pinion to mesh with said main gear,
   a coupler bar located exteriorly of each side of the main gear, each of said coupler bars being connected with said carriage at one end, and
   a universal type joint fixed to ground, the other end of each of said coupler bars being connected with said universal type joint, said universal joint being positioned between a first line tangent to said main gear at that point where said pinion mates with said main gear and a second line parallel to said first line that passes through the center axis of said main gear, thereby reducing the forces exerted on said carriage's roller during driving engagement of said pinion with said main gear.

2. Carriage support structure for a gear reduction device as set forth in claim 1, said coupler bars being disposed substantially parallel to the median plane of said main gear.

3. Carriage support structure for a gear reduction device as set forth in claim 1, said coupler bars being symmetrically disposed on each side of said main gear relative to the median plane of said main gear.

4. Carriage support structure for a gear reduction device as set forth in claim 1, said universal type joint comprising
   a swing bar disposed substantially transverse to the median plane of said main gear, said coupler bars being symmetrically joined relative to said median plane with said swing bar at articulated joints, and
   a transversal shaft interconnecting said swing bar and a mounting bracket fixed to ground, said transversal shaft being located in the median plane of said main gear and allowing said swing bar to oscillate in a plane transverse to said median plane.

* * * * *